(12) United States Patent
Lin et al.

(10) Patent No.: US 7,839,580 B1
(45) Date of Patent: Nov. 23, 2010

(54) COMPACT IMAGING LENS ASSEMBLY

(75) Inventors: Ming Ching Lin, Taichung (TW); Hsiang Chi Tang, Taichung (TW); Tsung Han Tsai, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 0 days.

(21) Appl. No.: 12/787,203

(22) Filed: May 25, 2010

(30) Foreign Application Priority Data

Dec. 7, 2009 (TW) .............................. 98141683 A

(51) Int. Cl.
*G02B 13/18* (2006.01)
*G02B 9/04* (2006.01)
(52) U.S. Cl. ........................... 359/717; 359/793
(58) Field of Classification Search ............. 359/717, 359/793
See application file for complete search history.

(56) References Cited

U.S. PATENT DOCUMENTS 7,446,955 B1  11/2008  Noda

2004/0179276 A1*  9/2004  Yamakawa ................. 359/793

* cited by examiner

*Primary Examiner*—Scott J Sugarman
(74) *Attorney, Agent, or Firm*—Tim Tingkang Xia; Morris, Manning & Martin, LLP

(57) ABSTRACT

This invention provides a compact imaging lens assembly comprising, in order from an object side to an image side: a first lens element with negative refractive power having a convex object-side surface and a concave image-side surface; a second lens element with positive refractive power, at least one of the object-side and image-side surfaces thereof being aspheric; and an aperture stop disposed between the second lens element and an image plane; wherein there are two lens elements with refractive power in the compact imaging lens assembly; and wherein the compact imaging lens assembly satisfies the relations: 0.40<f/f2<1.20, |R3/R4|>1.5. Such an arrangement of optical elements can effectively improve the image quality of the system, reduce the total track length of the lens assembly while maintaining a sufficient back focal length, and achieve a wide field of view.

25 Claims, 13 Drawing Sheets

| TABLE 1 | | | | | | |
|---|---|---|---|---|---|---|
| (Embodiment 1) | | | | | | |
| f = 0.61 mm, Fno = 2.75, HFOV = 61.4 deg. | | | | | | |
| Surface # | | Curvature Radius | Thickness | Material | Index | Abbe # | Focal length |
| 0 | Object | Plano | Infinity | | | | |
| 1 | Lens 1 | 3.45860 (ASP) | 0.300 | Plastic | 1.544 | 55.9 | -0.77 |
| 2 | | 0.36143 (ASP) | 0.552 | | | | |
| 3 | Lens 2 | 2.43467 (ASP) | 0.696 | Plastic | 1.544 | 55.9 | 0.76 |
| 4 | | -0.44510 (ASP) | -0.069 | | | | |
| 5 | Ape. Stop | Plano | 0.800 | | | | |
| 6 | IR-filter | Plano | 0.300 | Glass | 1.517 | 64.2 | - |
| 7 | | Plano | 0.378 | | | | |
| 8 | Image | Plano | | | | | |

Fig.5

| TABLE 2 | | | | |
|---|---|---|---|---|
| Aspheric Coefficients | | | | |
| Surface # | 1 | 2 | 3 | 4 |
| k = | 0.00000E+00 | -5.19915E-01 | -8.15235E+00 | -6.45334E-01 |
| A4 = | -5.74162E-02 | 1.04171E+00 | -9.93843E-01 | 1.01877E+00 |
| A6 = | 1.59132E-02 | -1.52565E+01 | -2.78560E+01 | -1.31473E+01 |
| A8 = | 1.04036E-02 | 1.41980E+02 | 1.94223E+02 | 5.86343E+01 |
| A10= | | -4.64804E+02 | -1.32756E+03 | |

Fig.6

| TABLE 3 | | | | | | |
|---|---|---|---|---|---|---|
| (Embodiment 2) | | | | | | |
| f= 0.63 mm, Fno = 2.85, HFOV = 60.4 deg. | | | | | | |
| Surface # | | Curvature Radius | Thickness | Material | Index | Abbe # | Focal length |
| 0 | Object | Plano | Infinity | | | | |
| 1 | Lens 1 | 1.33405 (ASP) | 0.300 | Plastic | 1.544 | 55.9 | -1.02 |
| 2 | | 0.36143 (ASP) | 0.712 | | | | |
| 3 | Lens 2 | -50.00000 (ASP) | 0.551 | Plastic | 1.544 | 55.9 | 0.77 |
| 4 | | -0.41450 (ASP) | -0.021 | | | | |
| 5 | Ape. Stop | Plano | 0.800 | | | | |
| 6 | IR-filter | Plano | 0.300 | Glass | 1.517 | 64.2 | - |
| 7 | | Plano | 0.281 | | | | |
| 8 | Image | Plano | | | | | |

Fig.7

| TABLE 4 | | | | |
|---|---|---|---|---|
| Aspheric Coefficients | | | | |
| Surface # | 1 | 2 | 3 | 4 |
| k = | 0.00000E+00 | -5.19915E-01 | -1.00000E+00 | -6.84723E-01 |
| A4 = | -8.67215E-02 | 1.04171E+00 | -8.40640E-01 | 6.59668E-01 |
| A6 = | -1.99264E-01 | -1.52565E+01 | -8.08741E+01 | -1.62987E+01 |
| A8 = | 3.17698E-02 | 1.41980E+02 | 1.01844E+03 | 8.86573E+01 |
| A10= | 6.44394E-02 | -4.64804E+02 | -7.00844E+03 | |

Fig.8

| TABLE 5 | | | | | | | |
|---|---|---|---|---|---|---|---|
| (Embodiment 3) | | | | | | | |
| f = 0.60 mm, Fno = 2.80, HFOV= 62.6 deg. | | | | | | | |
| Surface # | | Curvature Radius | Thickness | Material | Index | Abbe # | Focal length |
| 0 | Object | Plano | Infinity | | | | |
| 1 | Lens 1 | 1.35982 (ASP) | 0.300 | Plastic | 1.544 | 55.9 | -1.02 |
| 2 | | 0.36422 (ASP) | 0.859 | | | | |
| 3 | Lens 2 | 2.22685 (ASP) | 0.600 | Plastic | 1.514 | 56.8 | 0.80 |
| 4 | | -0.45473 (ASP) | -0.041 | | | | |
| 5 | Ape. Stop | Plano | 0.800 | | | | |
| 6 | IR-filter | Plano | 0.300 | Glass | 1.517 | 64.2 | - |
| 7 | | Plano | 0.235 | | | | |
| 8 | Image | Plano | | | | | |

Fig.9

| TABLE 6 | | | | |
|---|---|---|---|---|
| Aspheric Coefficients | | | | |
| Surface # | 1 | 2 | 3 | 4 |
| k = | 0.00000E+00 | -9.65937E-01 | -1.78977E+01 | -9.01068E-01 |
| A4 = | -1.02591E-01 | 2.57429E+00 | -7.23599E-01 | 3.04937E-01 |
| A6 = | -1.32128E-01 | -1.54037E+01 | -2.72978E+01 | -1.06559E+01 |
| A8 = | 4.51603E-02 | 1.09867E+02 | 2.20957E+02 | 5.03936E+01 |
| A10= | | -2.29565E+02 | -1.47282E+03 | |

Fig.10

| TABLE 7 | | | | | | |
|---|---|---|---|---|---|---|
| (Embodiment 4) | | | | | | |
| f = 2.94 mm, Fno = 2.80, HFOV = 26.5 deg. | | | | | | |
| Surface # | | Curvature Radius | Thickness | Material | Index | Abbe # | Focal length |
| 0 | Object | Plano | Infinity | | | | |
| 1 | Lens 1 | 3.44470 (ASP) | 2.000 | Plastic | 1.632 | 23.4 | -3.93 |
| 2 | | 1.11876 (ASP) | 0.295 | | | | |
| 3 | | Plano | 0.273 | | | | |
| 4 | Lens 2 | -10.77630 (ASP) | 0.797 | Plastic | 1.544 | 55.9 | 1.78 |
| 5 | | -0.91219 (ASP) | -0.162 | | | | |
| 6 | Ape. Stop | Plano | 2.000 | | | | |
| 7 | IR-filter | Plano | 0.700 | Glass | 1.517 | 64.2 | - |
| 8 | | Plano | 0.839 | | | | |
| 9 | Image | Plano | | | | | |
| Note: The effective aperture on the surface #3 is 1.10 mm. | | | | | | | |

Fig.11

| TABLE 8 | | | | |
|---|---|---|---|---|
| Aspheric Coefficients | | | | |
| Surface # | 1 | 2 | 4 | 5 |
| k = | 1.94565E-01 | -5.86009E+00 | -1.00000E+00 | -1.48397E+00 |
| A4 = | 4.45514E-03 | 5.83258E-01 | -9.72667E-02 | -1.82862E-01 |
| A6 = | 8.95866E-03 | 2.35534E+00 | 1.45794E-01 | -2.01645E-01 |
| A8 = | -5.95132E-03 | -1.11186E+01 | -2.44882E-01 | 4.66477E-01 |
| A10= | 2.19812E-03 | 2.57624E+01 | | -6.78809E-01 |
| A12= | -2.89715E-04 | | | |

Fig.12

| TABLE 9 | | | | |
|---|---|---|---|---|
| | Embodiment 1 | Embodiment 2 | Embodiment 3 | Embodiment 4 |
| f | 0.61 | 0.63 | 0.60 | 2.94 |
| Fno | 2.75 | 2.85 | 2.80 | 2.80 |
| HFOV | 61.4 | 60.4 | 62.6 | 26.5 |
| T12/f | 0.90 | 1.13 | 1.43 | 0.19 |
| Bf/f | 2.15 | 2.00 | 1.99 | 1.07 |
| R1/R2 | 9.57 | 3.69 | 3.73 | 3.08 |
| |R3/R4| | 5.47 | 120.63 | 4.90 | 11.81 |
| 1/R2 [mm$^{-1}$] | 2.77 | 2.77 | 2.75 | 0.89 |
| f/f1 | -0.79 | -0.62 | -0.59 | -0.75 |
| f/f2 | 0.80 | 0.82 | 0.75 | 1.65 |
| Tan$^{-1}$(ImgH/f) [degree] | 48.9 | 48.0 | 49.4 | 26.1 |
| SL/Bf | 1.05 | 1.02 | 1.03 | 1.05 |
| TTL/ImgH | 4.08 | 4.03 | 4.22 | 4.52 |

COMPACT IMAGING LENS ASSEMBLY

CROSS-REFERENCE TO RELATED APPLICATIONS

This non-provisional application claims priority under 35 U.S.C. §119(a) on Patent Application No(s). 098141683 filed in Taiwan, R.O.C. on Dec. 7, 2009, the entire contents of which are hereby incorporated by reference.

BACKGROUND OF THE INVENTION

1. Field of the Invention

The present invention relates to an imaging lens assembly, and more particularly, to a compact imaging lens assembly with a wide field of view.

2. Description of the Prior Art

In recent years, with the popularity of portable electronic products featuring photographing function, the demand for compact imaging lenses is increasing, and the sensor of a general photographing camera is none other than CCD (charge coupled device) or CMOS sensor (Complementary Metal Oxide Semiconductor Sensor). Furthermore, the pixel size of sensors becomes reduced due to the advancing semiconductor manufacturing technology and makes electronic products become more compact and powerful and feature a wider field of view. Therefore, there is an increasing demand for compact imaging lenses having a wide field of view.

A conventional wide angle imaging lens is generally configured such that the front lens group has negative refractive power and the rear lens group has positive refractive power, thereby forming an inverse telephoto structure to achieve a wide field of view. Additionally, an imaging lens, such as the wide-angle lens system disclosed in U.S. Pat. No. 7,446,955, generally comprises three, four or more than four lens elements so as to effectively correct the aberrations. However, the employment of excess number of lens elements will make it difficult to reduce the size of the lens and make a complicated manufacturing procedure, resulting in an increase in the manufacturing cost. Therefore, a need exists in the art for a compact imaging lens assembly that features simple configuration, low cost and a wide field of view.

SUMMARY OF THE INVENTION

In order to resolve the aforementioned problems, the present invention provides a compact imaging lens assembly comprising, in order from an object side to an image side: a first lens element with negative refractive power having a convex object-side surface and a concave image-side surface; a second lens element with positive refractive power, at least one of the object-side and image-side surfaces thereof being aspheric; and an aperture stop disposed between the second lens element and an image plane; wherein there are two lens elements with refractive power in the compact imaging lens assembly; and wherein a focal length of the compact imaging lens assembly is f, a focal length of the second lens element is f2, a radius of curvature of the object-side surface of the second lens element is R3, a radius of curvature of the image-side surface of the second lens element is R4, and they satisfy the relations: $0.40 < f/f2 < 1.20$, $|R3/R4| > 1.5$.

The present invention provides another compact imaging lens assembly comprising, in order from the object side to the image side: a first lens element with negative refractive power having a convex object-side surface and a concave image-side surface, at least one of the object-side and image-side surfaces thereof being aspheric; a second lens element with positive refractive power having a convex image-side surface, at least one of the object-side and image-side surfaces thereof being aspheric; and an aperture stop disposed between the second lens element and an image plane; wherein there are two lens elements with refractive power in the compact imaging lens assembly; wherein the compact imaging lens assembly further comprises an electronic sensor disposed at the image plane for image formation thereon; and wherein half of the diagonal length of the effective pixel area of the electronic sensor is ImgH, a focal length of the compact imaging lens assembly is f, and they satisfy the relation: $\mathrm{Tan}^{-1}(\mathrm{ImgH}/f) > 42$ deg.

The present invention provides yet another compact imaging lens assembly comprising, in order from the object side to the image side: a first lens element with negative refractive power having a convex object-side surface and a concave image-side surface, at least one of the object-side and image-side surfaces thereof being aspheric; a second lens element with positive refractive power having a convex image-side surface, at least one of the object-side and image-side surfaces thereof being aspheric; and an aperture stop disposed between the second lens element and an image plane; wherein there are two lens elements with refractive power in the compact imaging lens assembly; and wherein a radius of curvature of the object-side surface of the second lens element is R3, a radius of curvature of the image-side surface of the second lens element is R4, a radius of curvature of the object-side surface of the first lens element is R1, a radius of curvature of the image-side surface of the first lens element is R2, and they satisfy the relations: $|R3/R4| > 1.5$, $R1/R2 > 2.5$.

Such an arrangement of optical elements can effectively improve the image quality of the system, reduce the total track length of the lens assembly while maintaining a sufficient back focal length, and achieve a wide field of view.

In the aforementioned compact imaging lens assembly, the first lens element has negative refractive power, a convex object-side surface and a concave image-side surface so that the field of view of the compact imaging lens assembly can be favorably enlarged; the second lens element with positive refractive power may be a bi-convex lens element or a meniscus lens element having a concave object-side surface and a convex image-side surface. When the second lens element is a bi-convex lens element, the refractive power thereof can be effectively enhanced, thus shortening the total track length of the system. When the second lens element is a meniscus lens element, the astigmatism of the system can be corrected more favorably.

In the aforementioned compact imaging lens assembly, the aperture stop is disposed between the second lens element and the image plane. The first lens element provides negative refractive power, and the aperture stop is disposed near the image side of the compact imaging lens assembly, thereby the field of view of the compact imaging lens assembly can be effectively enlarged. For an optical system with a wide field of view, it requires special effort to correct the distortion and chromatic aberration of magnification, and the correction can be made by placing the aperture stop in a location where the refractive power of the system is balanced. In the present compact imaging lens assembly, the aperture stop is disposed between the second lens element and the image plane to enlarge the field of view of the system and to effectively reduce the sensitivity of the system at the same time.

BRIEF DESCRIPTION OF THE DRAWINGS

FIG. 5 is TABLE 1 which lists the optical data of the first embodiment.

FIG. 6 is TABLE 2 which lists the aspheric surface data of the first embodiment.

FIG. 7 is TABLE 3 which lists the optical data of the second embodiment.

FIG. 8 is TABLE 4 which lists the aspheric surface data of the second embodiment.

FIG. 9 is TABLE 5 which lists the optical data of the third embodiment.

FIG. 10 is TABLE 6 which lists the aspheric surface data of the third embodiment.

FIG. 11 is TABLE 7 which lists the optical data of the fourth embodiment.

FIG. 12 is TABLE 8 which lists the aspheric surface data of the fourth embodiment.

FIG. 13 is TABLE 9 which lists the data of the respective embodiments resulting from the equations.

DETAILED DESCRIPTION OF THE PREFERRED EMBODIMENTS

Figure 1A:
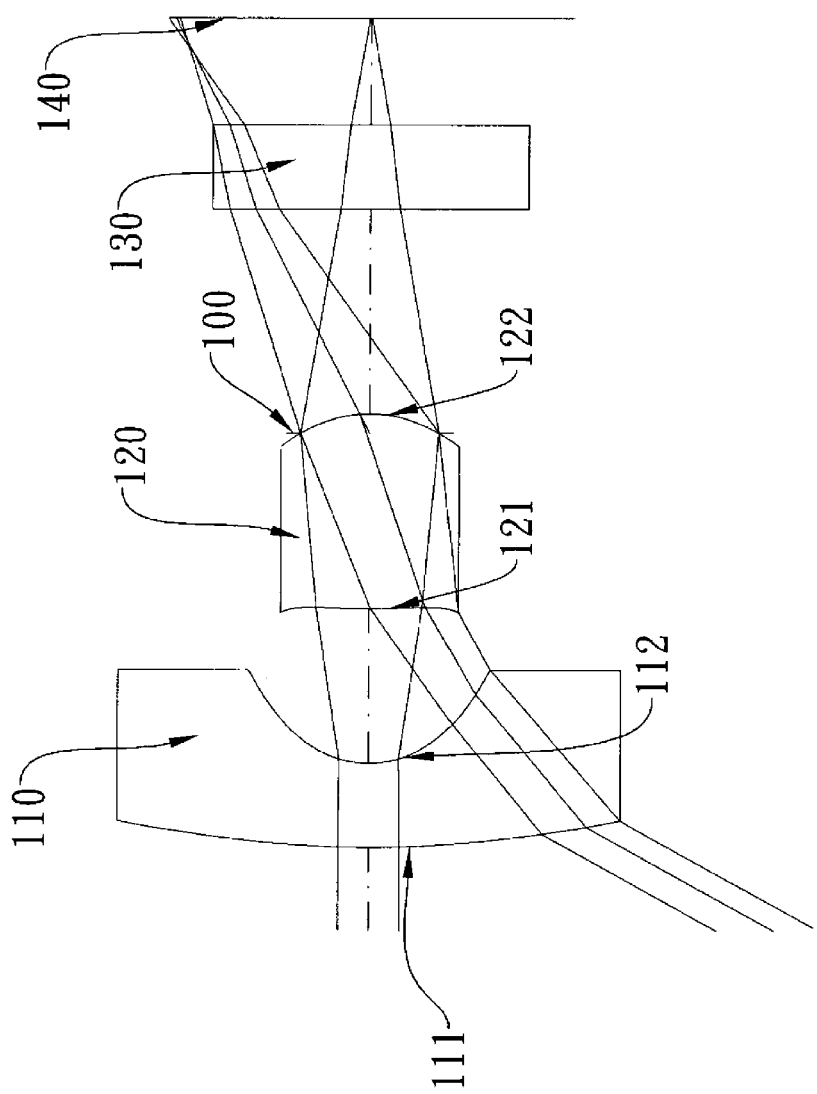
FIG. 1A shows a compact imaging lens assembly in accordance with a first embodiment of the present invention.

The present invention provides a compact imaging lens assembly comprising, in order from an object side to an image side: a first lens element with negative refractive power having a convex object-side surface and a concave image-side surface; a second lens element with positive refractive power, at least one of the object-side and image-side surfaces thereof being aspheric; and an aperture stop disposed between the second lens element and an image plane; wherein there are two lens elements with refractive power in the compact imaging lens assembly; and wherein the focal length of the compact imaging lens assembly is f, the focal length of the second lens element is f2, the radius of curvature of the object-side surface of the second lens element is R3, the radius of curvature of the image-side surface of the second lens element is R4, and they satisfy the relations: $0.40<f/f2<1.20$, $|R3/R4|>1.5$.

When the relation of $0.40<f/f2<1.20$ is satisfied, the refractive power of the second lens element is more balanced so that the total track length of the system can be effectively controlled. The above relation also prevents the high order spherical aberration from becoming too large, so that the image quality of the system can be improved. Preferably, f and f2 satisfy the relation: $0.60<f/f2<0.95$.

When the relation of $|R3/R4|>1.5$ is satisfied, the total track length of the compact imaging lens assembly can be favorably reduced and the spherical aberration of the system can be prevented from becoming too large. Preferably, R3 and R4 satisfy the relation: $|R3/R4|>3.0$.

In the aforementioned compact imaging lens assembly, it is preferable that the second lens element has a convex image-side surface. When the second lens element is a bi-convex lens element, the refractive power thereof can be effectively enhanced, thus shortening the total track length of the system. When the second lens element is a meniscus lens element, the astigmatism of the system can be corrected more favorably. Preferably, the object-side surfaces and image-side surfaces of the first and second lens elements are aspheric. Aspheric surfaces can be easily made into non-spherical profiles, allowing more design parameter freedom which can be used to reduce aberrations and the number of the lens elements. Accordingly, the total track length of the compact imaging lens assembly can be effectively reduced, the image quality of the system can be improved, and the manufacturing cost can be reduced.

In the aforementioned compact imaging lens assembly, the distance near the optical axis between the first and second lens elements is T12, the focal length of the compact imaging lens assembly is f, and they preferably satisfy the relation: $0.60<T12/f<2.00$. When the above relation is satisfied, the high order aberrations of the compact imaging lens assembly can be favorably corrected to improve the image quality of the system. The above relation also enables the lens elements to be placed closer together to facilitate reducing the total track length of the system.

In the aforementioned compact imaging lens assembly, the focal length of the compact imaging lens assembly is f, the focal length of the first lens element is f1, and they preferably satisfy the relation: $-1.20<f/f1<-0.20$. The above relation facilitates the enlargement of the field of view of the compact imaging lens assembly while preventing the total track length of the compact imaging lens assembly from becoming too long. And it will be more preferable that f and f1 satisfy the relation: $-0.90<f/f1<-0.40$.

In the aforementioned compact imaging lens assembly, the radius of curvature of the object-side surface of the first lens element is R1, the radius of curvature of the image-side surface of the first lens element is R2, and they preferably satisfy the relation: $R1/R2>2.5$. When the above relation is satisfied, the field of view of the compact imaging lens assembly can be effectively enlarged to achieve a wide field of view.

In the aforementioned compact imaging lens assembly, the distance near the optical axis between the image-side surface of the second lens element and the image plane is Bf, the focal length of the compact imaging lens assembly is f, and they preferably satisfy the relation: $1.5<Bf/f<4.5$. The above relation enables the compact imaging lens assembly to maintain a sufficient back focal length, thereby providing an ample space to accommodate other components. And it will be more preferable that Bf and f satisfy the relation: $1.9<Bf/f<3.0$.

The aforementioned compact imaging lens assembly further comprises an electronic sensor disposed at the image plane for image formation thereon. Half of the diagonal length of the effective pixel area of the electronic sensor is ImgH, the focal length of the compact imaging lens assembly is f, and they preferably satisfy the relation: $\mathrm{Tan}^{-1}(ImgH/f)>42$ deg. When the above relation is satisfied, the compact imaging lens assembly can have a wider field of view.

In the aforementioned compact imaging lens assembly, the radius of curvature of the image-side surface of the first lens element is R2, and it preferably satisfies the relation: $1.3\ \mathrm{mm}^{-1}<1/R2<10.0\ \mathrm{mm}^{-1}$. When the above relation is satisfied, the field of view of the compact imaging lens assembly can be favorably enlarged. The above relation also prevents the radius of curvature of the lens element from becoming too small to cause difficulties during the manufacturing process. And it will be more preferable that R2 satisfies the relation: $2.0\ \mathrm{mm}^{-1}<1/R2<5.0\ \mathrm{mm}^{-1}$.

In the aforementioned compact imaging lens assembly, the distance near the optical axis between the aperture stop and the image plane is SL, the distance near the optical axis between the image-side surface of the second lens element and the image plane is Bf, and they preferably satisfy the relation: $0.80<SL/Bf<1.10$. When the above relation is satisfied, a wide field of view can be favorably achieved, and the sensitivity of the system can be effectively reduced.

The aforementioned compact imaging lens assembly further comprises an electronic sensor disposed at the image plane for image formation thereon. The distance near the optical axis between the object-side surface of the first lens element and the electronic sensor is TTL, half of the diagonal length of the effective pixel area of the electronic sensor is ImgH, and they preferably satisfy the relation: $TTL/ImgH<5.0$. The above relation enables the compact imaging lens assembly to maintain a compact form so that it can be installed in compact portable electronic products.

The present invention provides another compact imaging lens assembly comprising, in order from the object side to the image side: a first lens element with negative refractive power having a convex object-side surface and a concave image-side surface, at least one of the object-side and image-side surfaces thereof being aspheric; a second lens element with positive refractive power having a convex image-side surface, at least one of the object-side and image-side surfaces thereof being aspheric; and an aperture stop disposed between the second lens element and an image plane; wherein there are two lens elements with refractive power in the compact imaging lens assembly; wherein the compact imaging lens assembly further comprises an electronic sensor disposed at the image plane for image formation thereon; and wherein half of the diagonal length of the effective pixel area of the electronic sensor is ImgH, the focal length of the compact imaging lens assembly is f, and they satisfy the relation: $\text{Tan}^{-1}(ImgH/f)>42$ deg.

When the relation of $\text{Tan}^{-1}(ImgH/f)>42$ deg. is satisfied, the compact imaging lens assembly can have a wider field of view.

In the aforementioned compact imaging lens assembly, it is preferable that the object-side surfaces and image-side surfaces of the first and second lens elements are aspheric. Aspheric surfaces can be easily made into non-spherical profiles, allowing more design parameter freedom which can be used to reduce aberrations and the number of the lens elements. Accordingly, the total track length of the compact imaging lens assembly can be effectively reduced, the image quality of the system can be improved, and the manufacturing cost can be reduced.

In the aforementioned compact imaging lens assembly, the focal length of the compact imaging lens assembly is f, the focal length of the second lens element is f2, and they preferably satisfy the relation: $0.40<f/f2<1.20$. When the above relation is satisfied, the refractive power of the second lens element is more balanced so that the total track length of the system can be effectively controlled. The above relation also prevents the high order spherical aberration from becoming too large, so that the image quality of the system can be improved. And it will be more preferable that f and f2 satisfy the relation: $0.60<f/f2<0.95$.

In the aforementioned compact imaging lens assembly, the distance near the optical axis between the first and second lens elements is T12, the focal length of the compact imaging lens assembly is f, and they preferably satisfy the relation: $0.60<T12/f<2.00$. When the above relation is satisfied, the high order aberrations of the compact imaging lens assembly can be favorably corrected to improve the image quality of the system. The above relation also enables the lens elements to be placed closer together to facilitate reducing the total track length of the system.

In the aforementioned compact imaging lens assembly, the radius of curvature of the image-side surface of the first lens element is R2, and it preferably satisfies the relation: $2.0\text{ mm}^{-1}<1/R2<5.0\text{ mm}^{-1}$. When the above relation is satisfied, the field of view of the compact imaging lens assembly can be favorably enlarged. The above relation also prevents the radius of curvature of the lens element from becoming too small to cause difficulties during the manufacturing process.

In the aforementioned compact imaging lens assembly, the radius of curvature of the object-side surface of the first lens element is R1, the radius of curvature of the image-side surface of the first lens element is R2, and they preferably satisfy the relation: $R1/R2>2.5$. When the above relation is satisfied, the field of view of the compact imaging lens assembly can be effectively enlarged to achieve a wide field of view.

The present invention provides yet another compact imaging lens assembly comprising, in order from the object side to the image side: a first lens element with negative refractive power having a convex object-side surface and a concave image-side surface, at least one of the object-side and image-side surfaces thereof being aspheric; a second lens element with positive refractive power having a convex image-side surface, at least one of the object-side and image-side surfaces thereof being aspheric; and an aperture stop disposed between the second lens element and an image plane; wherein there are two lens elements with refractive power in the compact imaging lens assembly; and wherein the radius of curvature of the object-side surface of the second lens element is R3, the radius of curvature of the image-side surface of the second lens element is R4, the radius of curvature of the object-side surface of the first lens element is R1, the radius of curvature of the image-side surface of the first lens element is R2, and they satisfy the relations: $|R3/R4|>1.5$, $R1/R2>2.5$.

When the relation of $|R3/R4|>1.5$ is satisfied, the total track length can be favorably reduced and the spherical aberration of the system can be prevented from becoming too large. Preferably, R3 and R4 satisfy the relation: $|R3/R4|>3.0$. When the relation of $R1/R2>2.5$ is satisfied, the field of view of the compact imaging lens assembly can be effectively enlarged to achieve a wide field of view.

In the aforementioned compact imaging lens assembly, the focal length of the compact imaging lens assembly is f, the focal length of the first lens element is f1, and they preferably satisfy the relation: $-0.90<f/f1<-0.40$. The above relation facilitates the enlargement of the field of view of the compact imaging lens assembly while preventing the total track length of the compact imaging lens assembly from becoming too long.

In the aforementioned compact imaging lens assembly, the radius of curvature of the image-side surface of the first lens element is R2, and it preferably satisfies the relation: $2.0\text{ mm}^{-1}<1/R2<5.0\text{ mm}^{-1}$. When the above relation is satisfied, the field of view of the compact imaging lens assembly can be favorably enlarged. The above relation also prevents the radius of curvature of the lens element from becoming too small to cause difficulties during the manufacturing process.

In the present compact imaging lens assembly, the lens elements can be made of glass or plastic material. If the lens elements are made of glass, there is more freedom in distributing the refractive power of the system. If plastic material is adopted to produce lens elements, the manufacturing cost will be reduced effectively.

In the present compact imaging lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
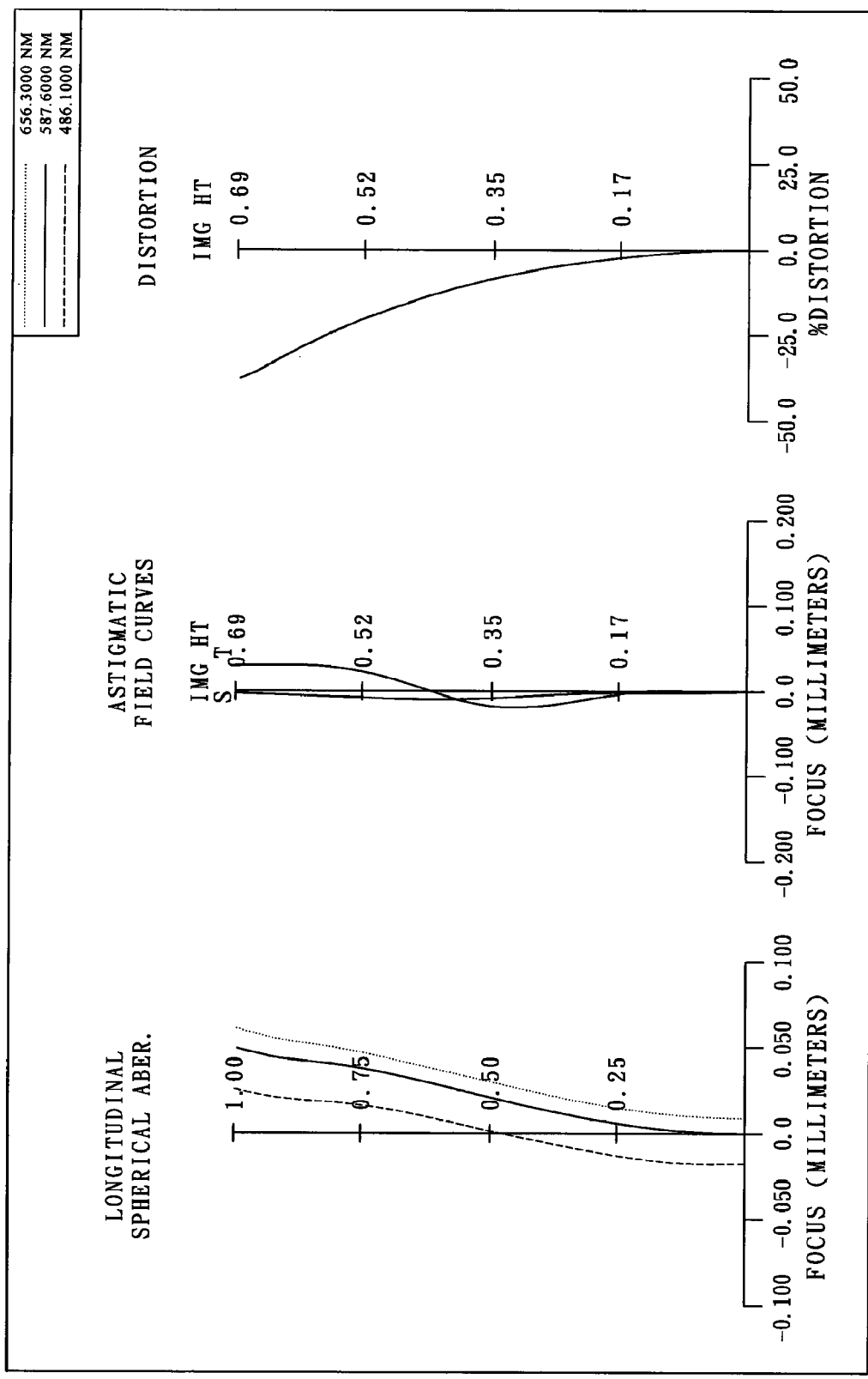
FIG. 1B shows the aberration curves of the first embodiment of the present invention.

FIG. 1A shows a compact imaging lens assembly in accordance with a first embodiment of the present invention, and FIG. 1B shows the aberration curves of the first embodiment of the present invention. The compact imaging lens assembly of the first embodiment of the present invention mainly comprises two lens elements, in order from an object side to an image side: a plastic first lens element 110 with negative refractive power having a convex object-side surface 111 and a concave image-side surface 112, the object-side and image-side surfaces 111 and 112 thereof being aspheric; and a plastic second lens element 120 with positive refractive power having a convex object-side surface 121 and a convex image-side surface 122, the object-side and image-side surfaces 121 and 122 thereof being aspheric; wherein an aperture stop 100 is disposed between the second lens element 120 and an image plane 140; wherein an IR filter 130 is disposed between the image-side surface 122 of the second lens element 120 and the image plane 140; and wherein the IR filter 130 has no influence on the focal length of the compact imaging lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present compact imaging lens assembly, the focal length of the compact imaging lens assembly is f, and it satisfies the relation: f=0.61 (mm).

In the first embodiment of the present compact imaging lens assembly, the f-number of the compact imaging lens assembly is Fno, and it satisfies the relation: Fno=2.75.

In the first embodiment of the present compact imaging lens assembly, half of the maximal field of view of the compact imaging lens assembly is HFOV, and it satisfies the relation: HFOV=61.4 deg. In the first embodiment of the present compact imaging lens assembly, the distance near the optical axis between the first lens element 110 and the second lens element 120 is T12, the focal length of the compact imaging lens assembly is f, and they satisfy the relation: T12/f=0.90.

In the first embodiment of the present compact imaging lens assembly, the distance near the optical axis between the image-side surface 122 of the second lens element 120 and the image plane 140 is Bf, the focal length of the compact imaging lens assembly is f, and they satisfy the relation: Bf/f=2.15.

In the first embodiment of the present compact imaging lens assembly, the radius of curvature of the object-side surface 111 of the first lens element 110 is R1, the radius of curvature of the image-side surface 112 of the first lens element 110 is R2, and they satisfy the relation: R1/R2=9.57.

In the first embodiment of the present compact imaging lens assembly, the radius of curvature of the object-side surface 121 of the second lens element 120 is R3, the radius of curvature of the image-side surface 122 of the second lens element 120 is R4, and they satisfy the relation: |R3/R4|=5.47.

In the first embodiment of the present compact imaging lens assembly, the radius of curvature of the image-side surface 112 of the first lens element 110 is R2, and it satisfies the relation: $1/R2=2.77$ mm$^{-1}$.

In the first embodiment of the present compact imaging lens assembly, the focal length of the compact imaging lens assembly is f, the focal length of the first lens element 110 is f1, and they satisfy the relation: f/f1=−0.79.

In the first embodiment of the present compact imaging lens assembly, the focal length of the compact imaging lens assembly is f, the focal length of the second lens element 120 is f2, and they satisfy the relation: f/f2=0.80.

In the first embodiment of the present compact imaging lens assembly, the compact imaging lens assembly further comprises an electronic sensor disposed at the image plane 140 for image formation thereon. Half of the diagonal length of the effective pixel area of the electronic sensor is ImgH, the focal length of the compact imaging lens assembly is f, and they satisfy the relation: Tan$^{-1}$ (ImgH/f)=48.9 deg.

In the first embodiment of the present compact imaging lens assembly, the distance near the optical axis between the aperture stop 100 and the image plane 140 is SL, the distance near the optical axis between the image-side surface 122 of the second lens element 120 and the image plane 140 is Bf, and they satisfy the relation: SL/Bf=1.05.

In the first embodiment of the present compact imaging lens assembly, the distance near the optical axis between the object-side surface 111 of the first lens element 110 and the electronic sensor is TTL, half of the diagonal length of the effective pixel area of the electronic sensor is ImgH, and they satisfy the relation: TTL/ImgH=4.08.

The detailed optical data of the first embodiment is shown in FIG. 5 (TABLE 1), and the aspheric surface data is shown in FIG. 6 (TABLE 2), wherein the units of the radius of curvature, the thickness and the focal length are expressed in mm, and HFOV is half of the maximal field of view.

Figure 2A:
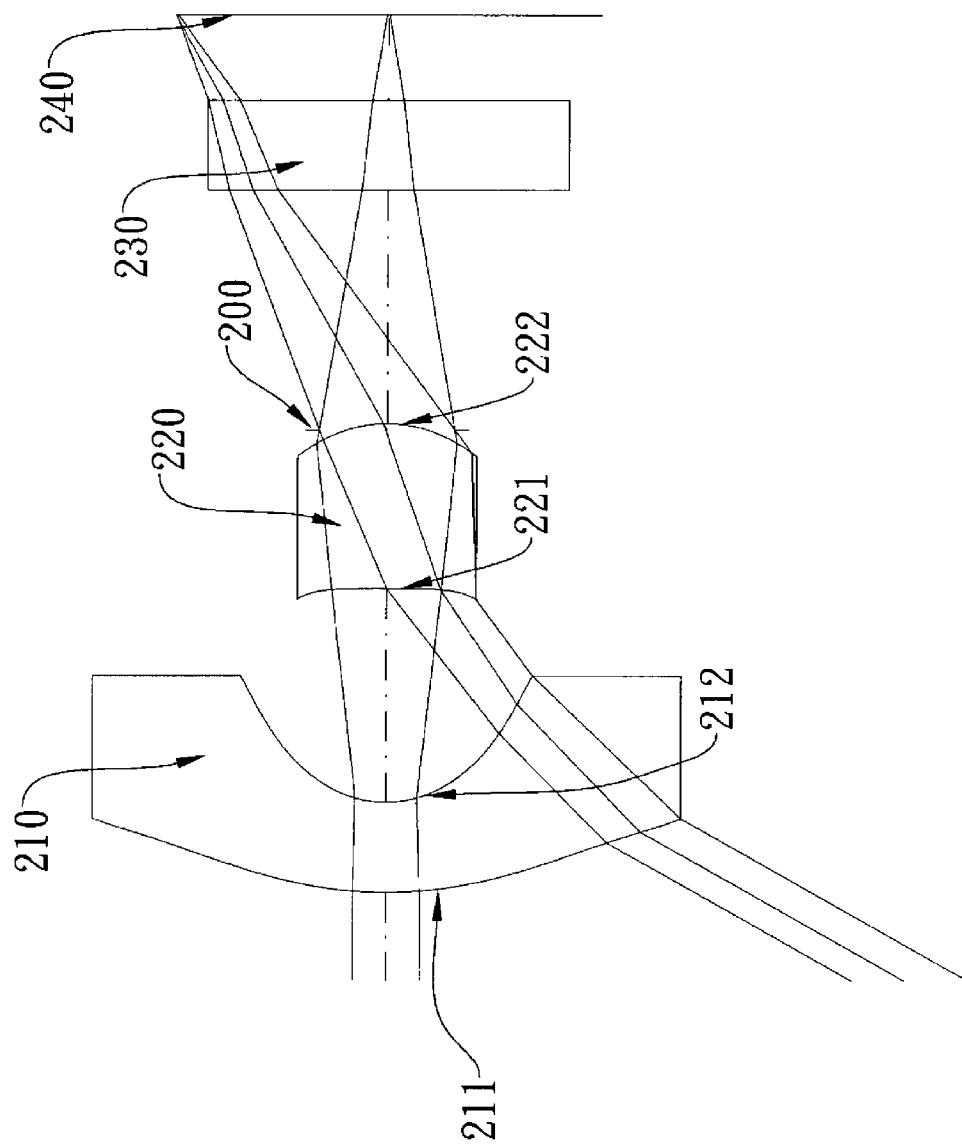
FIG. 2A shows a compact imaging lens assembly in accordance with a second embodiment of the present invention.
Figure 2B:
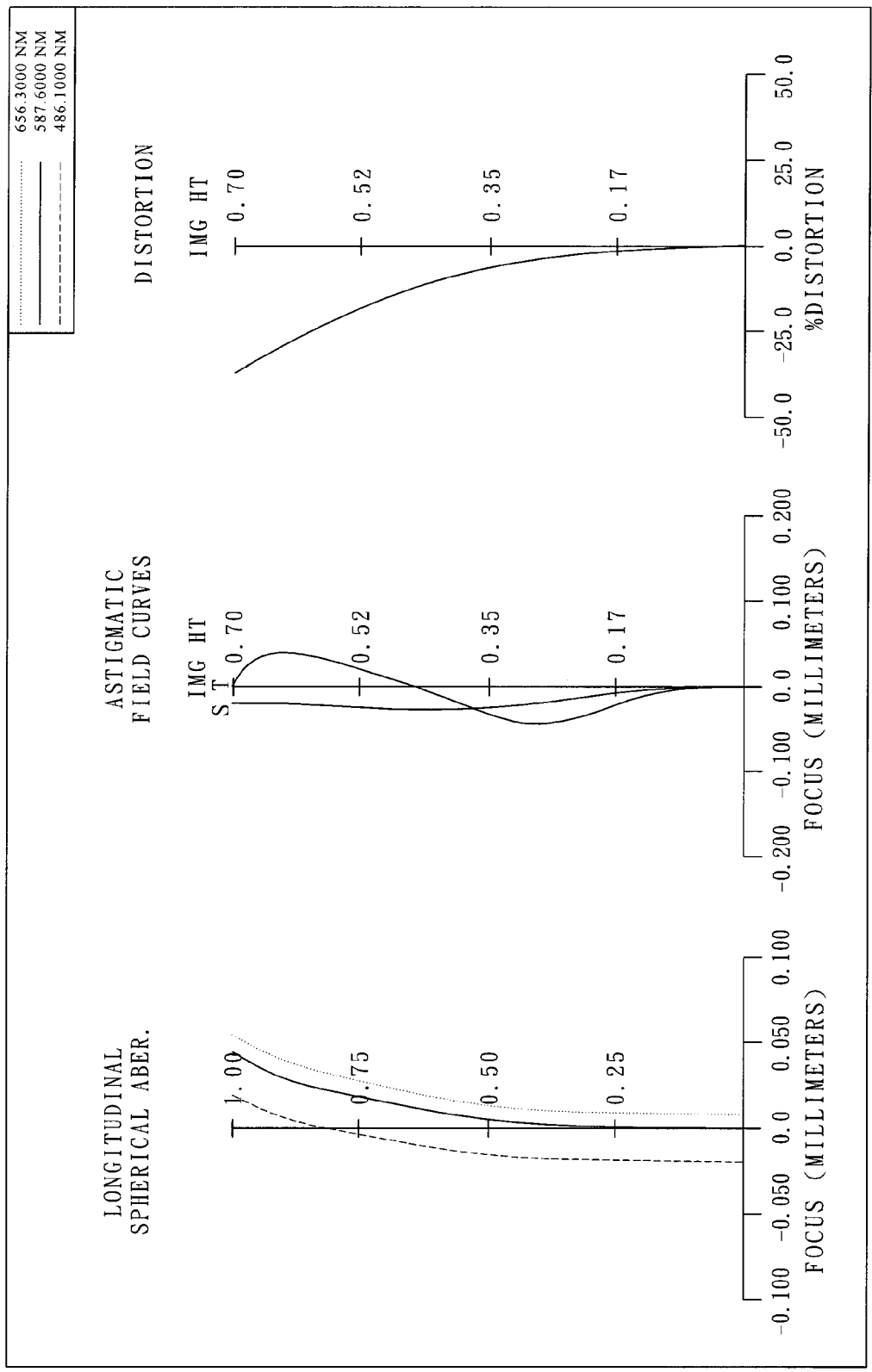
FIG. 2B shows the aberration curves of the second embodiment of the present invention.

FIG. 2A shows a compact imaging lens assembly in accordance with a second embodiment of the present invention, and FIG. 2B shows the aberration curves of the second embodiment of the present invention. The compact imaging lens assembly of the second embodiment of the present invention mainly comprises two lens elements, in order from the object side to the image side: a plastic first lens element 210 with negative refractive power having a convex object-side surface 211 and a concave image-side surface 212, the object-side and image-side surfaces 211 and 212 thereof being aspheric; and a plastic second lens element 220 with positive refractive power having a concave object-side surface 221 and a convex image-side surface 222, the object-side and image-side surfaces 221 and 222 thereof being aspheric; wherein an aperture stop 200 is disposed between the second lens element 220 and an image plane 240; wherein an IR filter 230 is disposed between the image-side surface 222 of the second lens element 220 and the image plane 240; and wherein the IR filter 230 has no influence on the focal length of the compact imaging lens assembly.

The equation of the aspheric surface profiles of the second embodiment has the same form as that of the first embodiment.

In the second embodiment of the present compact imaging lens assembly, the focal length of the compact imaging lens assembly is f, and it satisfies the relation: f=0.63 (mm).

In the second embodiment of the present compact imaging lens assembly, the f-number of the compact imaging lens assembly is Fno, and it satisfies the relation: Fno=2.85.

In the second embodiment of the present compact imaging lens assembly, half of the maximal field of view of the compact imaging lens assembly is HFOV, and it satisfies the relation: HFOV=60.4 deg.

In the second embodiment of the present compact imaging lens assembly, the distance near the optical axis between the first lens element 210 and the second lens element 220 is T12, the focal length of the compact imaging lens assembly is f, and they satisfy the relation: T12/f=1.13.

In the second embodiment of the present compact imaging lens assembly, the distance near the optical axis between the image-side surface 222 of the second lens element 220 and the image plane 240 is Bf, the focal length of the compact imaging lens assembly is f, and they satisfy the relation: Bf/f=2.00.

In the second embodiment of the present compact imaging lens assembly, the radius of curvature of the object-side surface 211 of the first lens element 210 is R1, the radius of curvature of the image-side surface 212 of the first lens element 210 is R2, and they satisfy the relation: R1/R2=3.69.

In the second embodiment of the present compact imaging lens assembly, the radius of curvature of the object-side surface 221 of the second lens element 220 is R3, the radius of curvature of the image-side surface 222 of the second lens element 220 is R4, and they satisfy the relation: |R3/R4|=120.63.

In the second embodiment of the present compact imaging lens assembly, the radius of curvature of the image-side surface 212 of the first lens element 210 is R2, and it satisfies the relation: 1/R2=2.77 mm$^{-1}$.

In the second embodiment of the present compact imaging lens assembly, the focal length of the compact imaging lens assembly is f, the focal length of the first lens element 210 is f1, and they satisfy the relation: f/f1=−0.62.

In the second embodiment of the present compact imaging lens assembly, the focal length of the compact imaging lens assembly is f, the focal length of the second lens element 220 is f2, and they satisfy the relation: f/f2=0.82.

In the second embodiment of the present compact imaging lens assembly, the compact imaging lens assembly further comprises an electronic sensor disposed at the image plane 240 for image formation thereon. Half of the diagonal length of the effective pixel area of the electronic sensor is ImgH, the focal length of the compact imaging lens assembly is f, and they satisfy the relation: Tan$^{-1}$ (ImgH/f)=48.0 deg.

In the second embodiment of the present compact imaging lens assembly, the distance near the optical axis between the aperture stop 200 and the image plane 240 is SL, the distance near the optical axis between the image-side surface 222 of the second lens element 220 and the image plane 240 is Bf, and they satisfy the relation: SL/Bf=1.02.

In the second embodiment of the present compact imaging lens assembly, the distance near the optical axis between the object-side surface 211 of the first lens element 210 and the electronic sensor is TTL, half of the diagonal length of the effective pixel area of the electronic sensor is ImgH, and they satisfy the relation: TTL/ImgH=4.03.

The detailed optical data of the second embodiment is shown in FIG. 7 (TABLE 3), and the aspheric surface data is shown in FIG. 8 (TABLE 4), wherein the units of the radius of curvature, the thickness and the focal length are expressed in mm, and HFOV is half of the maximal field of view.

Figure 3A:
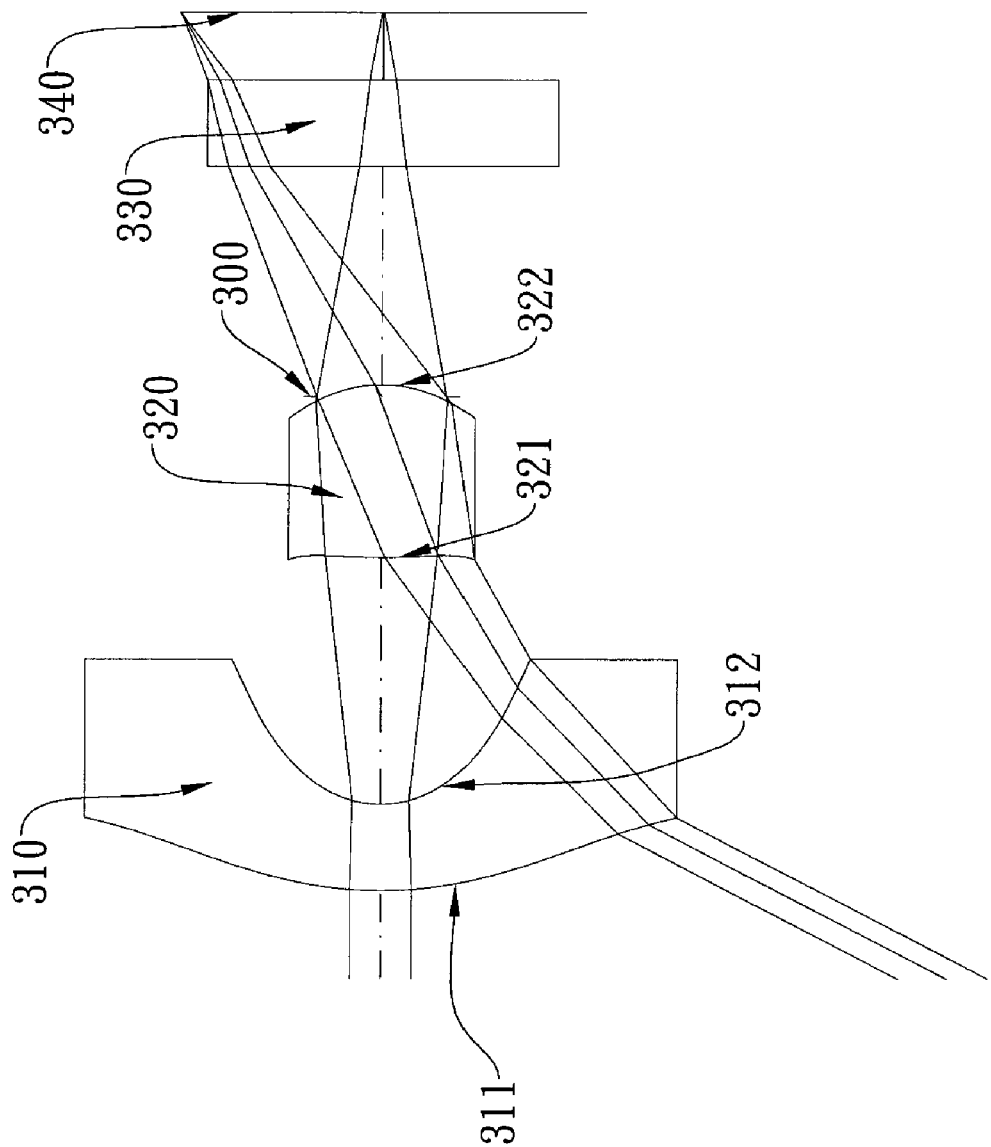
FIG. 3A shows a compact imaging lens assembly in accordance with a third embodiment of the present invention.
Figure 3B:
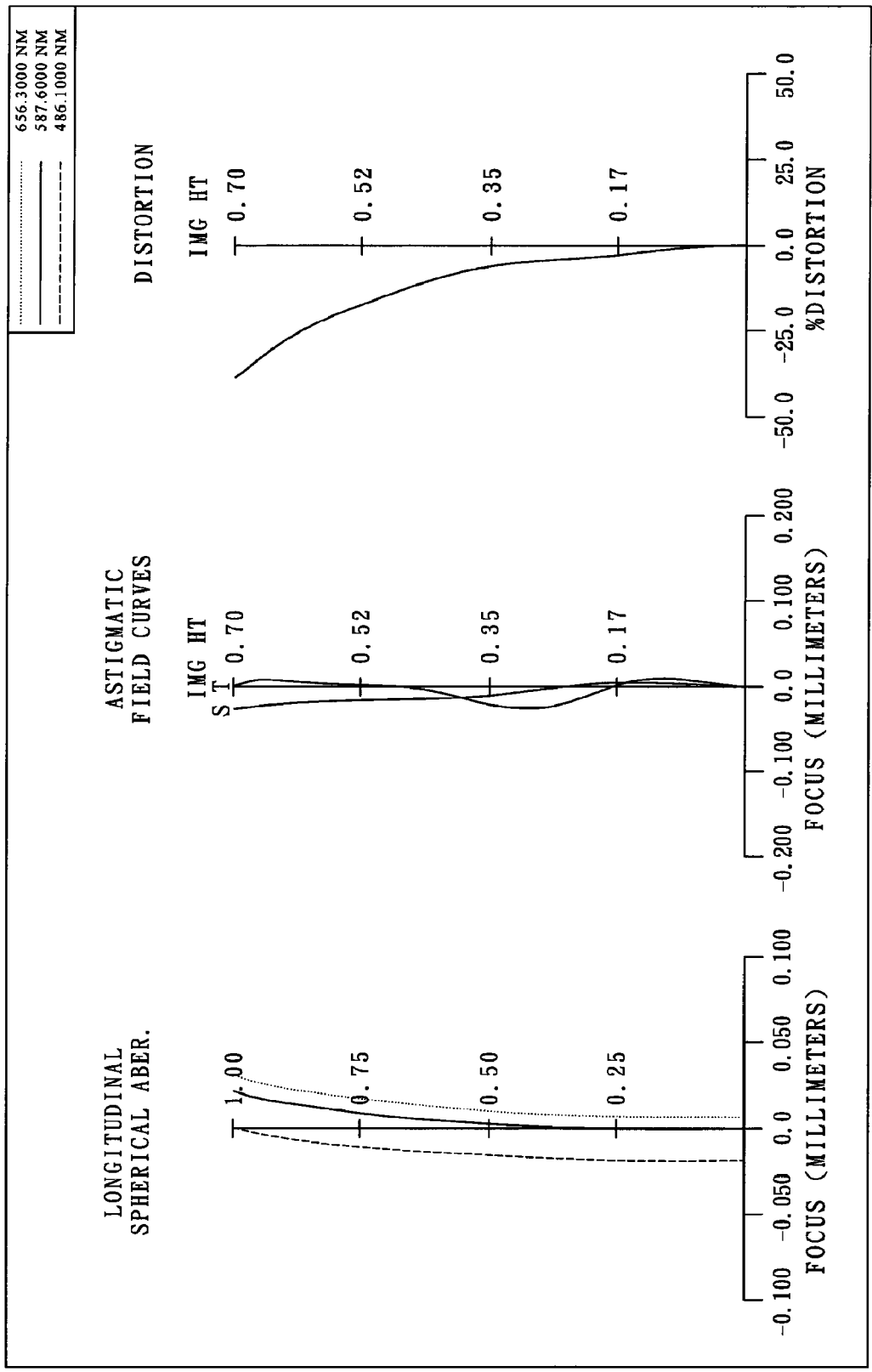
FIG. 3B shows the aberration curves of the third embodiment of the present invention.

FIG. 3A shows a compact imaging lens assembly in accordance with a third embodiment of the present invention, and FIG. 3B shows the aberration curves of the third embodiment of the present invention. The compact imaging lens assembly of the third embodiment of the present invention mainly comprises two lens elements, in order from the object side to the image side: a plastic first lens element 310 with negative refractive power having a convex object-side surface 311 and a concave image-side surface 312, the object-side and image-side surfaces 311 and 312 thereof being aspheric; and a plastic second lens element 320 with positive refractive power having a convex object-side surface 321 and a convex image-side surface 322, the object-side and image-side surfaces 321 and 322 thereof being aspheric; wherein an aperture stop 300 is disposed between the second lens element 320 and an image plane 340; wherein an IR filter 330 is disposed between the image-side surface 322 of the second lens element 320 and the image plane 340; and wherein the IR filter 330 has no influence on the focal length of the compact imaging lens assembly.

The equation of the aspheric surface profiles of the third embodiment has the same form as that of the first embodiment.

In the third embodiment of the present compact imaging lens assembly, the focal length of the compact imaging lens assembly is f, and it satisfies the relation: f=0.60 (mm).

In the third embodiment of the present compact imaging lens assembly, the f-number of the compact imaging lens assembly is Fno, and it satisfies the relation: Fno=2.80.

In the third embodiment of the present compact imaging lens assembly, half of the maximal field of view of the compact imaging lens assembly is HFOV, and it satisfies the relation: HFOV=62.6 deg.

In the third embodiment of the present compact imaging lens assembly, the distance near the optical axis between the first lens element 310 and the second lens element 320 is T12, the focal length of the compact imaging lens assembly is f, and they satisfy the relation: T12/f=1.43.

In the third embodiment of the present compact imaging lens assembly, the distance near the optical axis between the image-side surface 322 of the second lens element 320 and the image plane 340 is Bf, the focal length of the compact imaging lens assembly is f, and they satisfy the relation: Bf/f=1.99.

In the third embodiment of the present compact imaging lens assembly, the radius of curvature of the object-side surface 311 of the first lens element 310 is R1, the radius of curvature of the image-side surface 312 of the first lens element 310 is R2, and they satisfy the relation: R1/R2=3.73.

In the third embodiment of the present compact imaging lens assembly, the radius of curvature of the object-side surface 321 of the second lens element 320 is R3, the radius of curvature of the image-side surface 322 of the second lens element 320 is R4, and they satisfy the relation: |R3/R4|=4.90.

In the third embodiment of the present compact imaging lens assembly, the radius of curvature of the image-side surface 312 of the first lens element 310 is R2, and it satisfies the relation: 1/R2=2.75 mm$^{-1}$.

In the third embodiment of the present compact imaging lens assembly, the focal length of the compact imaging lens assembly is f, the focal length of the first lens element 310 is f1, and they satisfy the relation: f/f1=−0.59.

In the third embodiment of the present compact imaging lens assembly, the focal length of the compact imaging lens assembly is f, the focal length of the second lens element 320 is f2, and they satisfy the relation: f/f2=0.75.

In the third embodiment of the present compact imaging lens assembly, the compact imaging lens assembly further comprises an electronic sensor disposed at the image plane 340 for image formation thereon. Half of the diagonal length of the effective pixel area of the electronic sensor is ImgH, the focal length of the compact imaging lens assembly is f, and they satisfy the relation: $\text{Tan}^{-1}$ (ImgH/f)=49.4 deg.

In the third embodiment of the present compact imaging lens assembly, the distance near the optical axis between the aperture stop 300 and the image plane 340 is SL, the distance near the optical axis between the image-side surface 322 of the second lens element 320 and the image plane 340 is Bf, and they satisfy the relation: SL/Bf=1.03.

In the third embodiment of the present compact imaging lens assembly, the distance near the optical axis between the object-side surface 311 of the first lens element 310 and the electronic sensor is TTL, half of the diagonal length of the effective pixel area of the electronic sensor is ImgH, and they satisfy the relation: TTL/ImgH=4.22.

The detailed optical data of the third embodiment is shown in FIG. 9 (TABLE 5), and the aspheric surface data is shown in FIG. 10 (TABLE 6), wherein the units of the radius of curvature, the thickness and the focal length are expressed in mm, and HFOV is half of the maximal field of view.

Figure 4A:
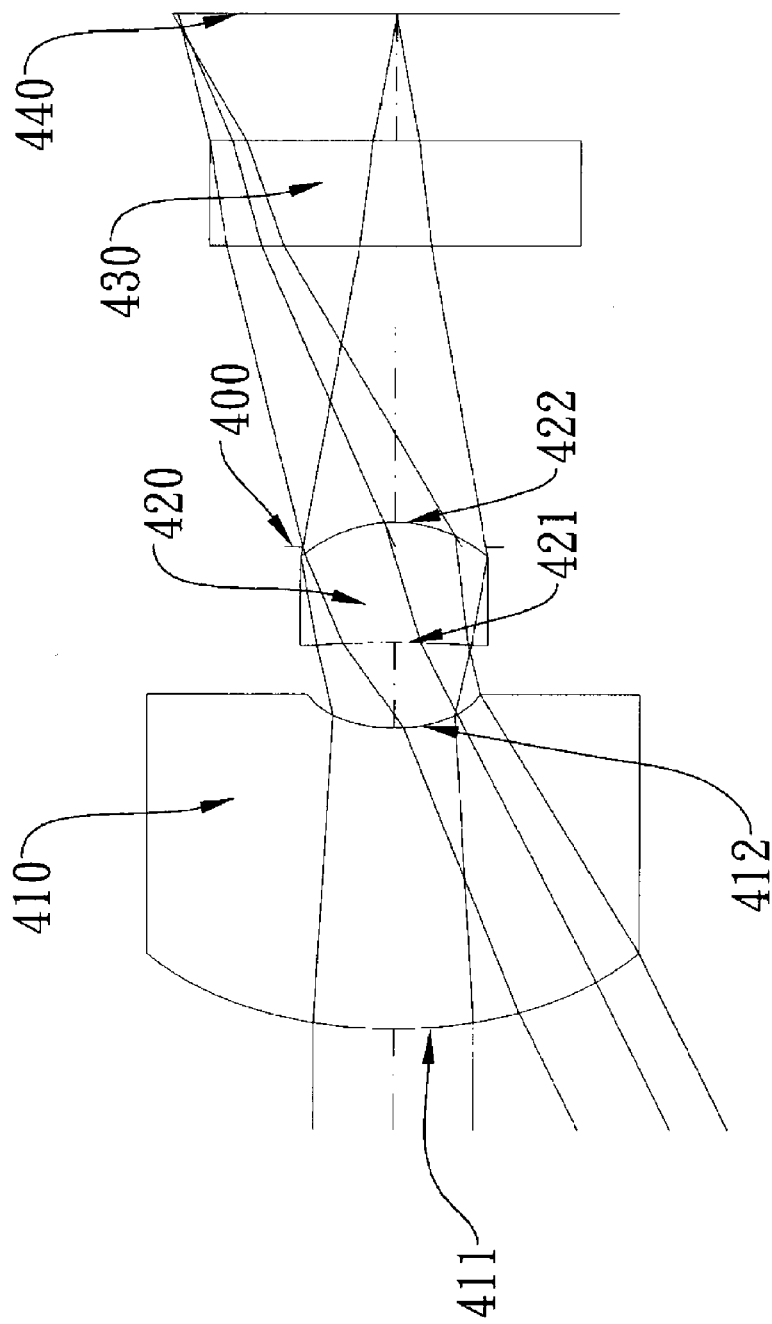
FIG. 4A shows a compact imaging lens assembly in accordance with a fourth embodiment of the present invention.
Figure 4B:
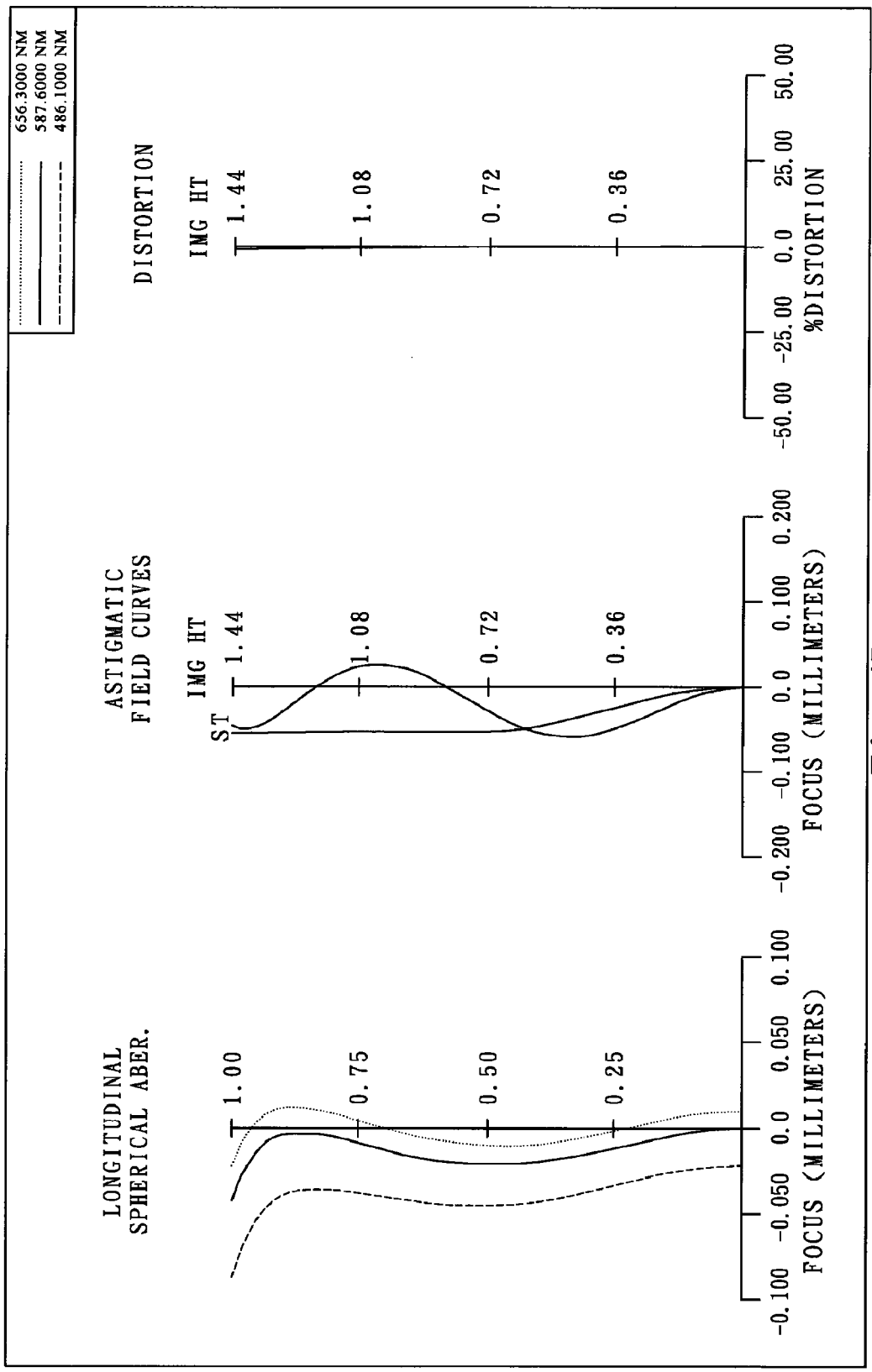
FIG. 4B shows the aberration curves of the fourth embodiment of the present invention.

FIG. 4A shows a compact imaging lens assembly in accordance with a fourth embodiment of the present invention, and FIG. 4B shows the aberration curves of the fourth embodiment of the present invention. The compact imaging lens assembly of the fourth embodiment of the present invention mainly comprises two lens elements, in order from the object side to the image side: a plastic first lens element 410 with negative refractive power having a convex object-side surface 411 and a concave image-side surface 412, the object-side and image-side surfaces 411 and 412 thereof being aspheric; and a plastic second lens element 420 with positive refractive power having a concave object-side surface 421 and a convex image-side surface 422, the object-side and image-side surfaces 421 and 422 thereof being aspheric; wherein an aperture stop 400 is disposed between the second lens element 420 and an image plane 440; wherein an IR filter 430 is disposed between the image-side surface 422 of the second lens element 420 and the image plane 440; and wherein the IR filter 430 has no influence on the focal length of the compact imaging lens assembly.

The equation of the aspheric surface profiles of the fourth embodiment has the same form as that of the first embodiment.

In the fourth embodiment of the present compact imaging lens assembly, the focal length of the compact imaging lens assembly is f, and it satisfies the relation: f=2.94 (mm).

In the fourth embodiment of the present compact imaging lens assembly, the f-number of the compact imaging lens assembly is Fno, and it satisfies the relation: Fno=2.80.

In the fourth embodiment of the present compact imaging lens assembly, half of the maximal field of view of the compact imaging lens assembly is HFOV, and it satisfies the relation: HFOV=26.5 deg.

In the fourth embodiment of the present compact imaging lens assembly, the distance near the optical axis between the first lens element 410 and the second lens element 420 is T12, the focal length of the compact imaging lens assembly is f, and they satisfy the relation: T12/f=0.19.

In the fourth embodiment of the present compact imaging lens assembly, the distance near the optical axis between the image-side surface 422 of the second lens element 420 and the image plane 440 is Bf, the focal length of the compact imaging lens assembly is f, and they satisfy the relation: Bf/f=1.07.

In the fourth embodiment of the present compact imaging lens assembly, the radius of curvature of the object-side surface 411 of the first lens element 410 is R1, the radius of curvature of the image-side surface 412 of the first lens element 410 is R2, and they satisfy the relation: R1/R2=3.08.

In the fourth embodiment of the present compact imaging lens assembly, the radius of curvature of the object-side surface 421 of the second lens element 420 is R3, the radius of curvature of the image-side surface 422 of the second lens element 420 is R4, and they satisfy the relation: |R3/R4|=11.81.

In the fourth embodiment of the present compact imaging lens assembly, the radius of curvature of the image-side surface 412 of the first lens element 410 is R2, and it satisfies the relation: $1/R2=0.89 \text{ mm}^{-1}$.

In the fourth embodiment of the present compact imaging lens assembly, the focal length of the compact imaging lens assembly is f, the focal length of the first lens element 410 is f1, and they satisfy the relation: f/f1=−0.75.

In the fourth embodiment of the present compact imaging lens assembly, the focal length of the compact imaging lens assembly is f, the focal length of the second lens element 420 is f2, and they satisfy the relation: f/f2=1.65.

In the fourth embodiment of the present compact imaging lens assembly, the compact imaging lens assembly further comprises an electronic sensor disposed at the image plane 440 for image formation thereon. Half of the diagonal length of the effective pixel area of the electronic sensor is ImgH, the focal length of the compact imaging lens assembly is f, and they satisfy the relation: $\text{Tan}^{-1}$ (ImgH/f)=26.1 deg.

In the fourth embodiment of the present compact imaging lens assembly, the distance near the optical axis between the aperture stop 400 and the image plane 440 is SL, the distance near the optical axis between the image-side surface 422 of the second lens element 420 and the image plane 440 is Bf, and they satisfy the relation: SL/Bf=1.05.

In the fourth embodiment of the present compact imaging lens assembly, the distance near the optical axis between the object-side surface 411 of the first lens element 410 and the electronic sensor is TTL, half of the diagonal length of the effective pixel area of the electronic sensor is ImgH, and they satisfy the relation: TTL/ImgH=4.52.

The detailed optical data of the fourth embodiment is shown in FIG. 11 (TABLE 7), and the aspheric surface data is shown in FIG. 12 (TABLE 8), wherein the units of the radius of curvature, the thickness and the focal length are expressed in mm, and HFOV is half of the maximal field of view.

It is to be noted that TABLES 1-8 (illustrated in FIGS. 5-12 respectively) show different data of the different embodiments, however, the data of the different embodiments are obtained from experiments. Therefore, any compact imaging lens assembly of the same structure is considered to be within the scope of the present invention even if it uses different data. The embodiments depicted above and the appended drawings are exemplary and are not intended to limit the claim scope of the present invention. TABLE 9 (illustrated in FIG. 13) shows the data of the respective embodiments resulting from the equations.

What is claimed is:

1. A compact imaging lens assembly comprising, in order from an object side to an image side:

a first lens element with negative refractive power having a convex object-side surface and a concave image-side surface;

a second lens element with positive refractive power, at least one of the object-side and image-side surfaces thereof being aspheric; and an aperture stop disposed between the second lens element and an image plane; wherein there are two lens elements with refractive power in the compact imaging lens assembly; and wherein a focal length of the compact imaging lens assembly is f, a focal length of the second lens element is f2, a radius of curvature of the object-side surface of the second lens element is R3, a radius of curvature of the image-side surface of the second lens element is R4, and they satisfy the relations: $0.40<f/f2<1.20$, $|R3/R4|>1.5$.

2. The compact imaging lens assembly according to claim 1, wherein the second lens element has a convex image-side surface, and the object-side surfaces and image-side surfaces of the first and second lens elements are aspheric.

3. The compact imaging lens assembly according to claim 2, wherein the focal length of the compact imaging lens assembly is f, the focal length of the second lens element is f2, and they satisfy the relation: $0.60<f/f2<0.95$.

4. The compact imaging lens assembly according to claim 2, wherein a distance near the optical axis between the first and second lens elements is T12, the focal length of the compact imaging lens assembly is f, and they satisfy the relation: $0.60<T12/f<2.00$.

5. The compact imaging lens assembly according to claim 2, wherein the focal length of the compact imaging lens assembly is f, a focal length of the first lens element is f1, and they satisfy the relation: $-1.20<f/f1<-0.20$.

6. The compact imaging lens assembly according to claim 5, wherein the focal length of the compact imaging lens assembly is f, the focal length of the first lens element is f1, and they satisfy the relation: $-0.90<f/f1<-0.40$.

7. The compact imaging lens assembly according to claim 2, wherein a radius of curvature of the object-side surface of the first lens element is R1, a radius of curvature of the image-side surface of the first lens element is R2, and they satisfy the relation: $R1/R2>2.5$.

8. The compact imaging lens assembly according to claim 2, wherein a distance near the optical axis between the image-side surface of the second lens element and the image plane is Bf, the focal length of the compact imaging lens assembly is f, and they satisfy the relation: $1.5<Bf/f<4.5$.

9. The compact imaging lens assembly according to claim 8, wherein the distance near the optical axis between the image-side surface of the second lens element and the image plane is Bf, the focal length of the compact imaging lens assembly is f, and they satisfy the relation: $1.9<Bf/f<3.0$.

10. The compact imaging lens assembly according to claim 2 further comprising an electronic sensor disposed at the image plane for image formation thereon, wherein half of the diagonal length of the effective pixel area of the electronic sensor is ImgH, the focal length of the compact imaging lens assembly is f, and they satisfy the relation: $\text{Tan}^{-1}(\text{ImgH}/f)>42$ deg.

11. The compact imaging lens assembly according to claim 1, wherein a radius of curvature of the image-side surface of the first lens element is R2, and it satisfies the relation: $1.3\text{ mm}^{-1}<1/R2<10.0\text{ mm}^{-1}$.

12. The compact imaging lens assembly according to claim 11, wherein the radius of curvature of the image-side surface of the first lens element is R2, and it satisfies the relation: $2.0\text{ mm}^{-1}<1/R2<5.0\text{ mm}^{-1}$.

13. The compact imaging lens assembly according to claim 3, wherein the radius of curvature of the object-side surface of the second lens element is R3, the radius of curvature of the image-side surface of the second lens element is R4, and they satisfy the relation: $|R3/R4|>3.0$.

14. The compact imaging lens assembly according to claim 2, wherein a distance near the optical axis between the aperture stop and the image plane is SL, a distance near the optical axis between the image-side surface of the second lens element and the image plane is Bf, and they satisfy the relation: $0.80<SL/Bf<1.10$.

15. The compact imaging lens assembly according to claim 1 further comprising an electronic sensor disposed at the image plane for image formation thereon, wherein a distance near the optical axis between the object-side surface of the first lens element and the electronic sensor is TTL, half of the diagonal length of the effective pixel area of the electronic sensor is ImgH, and they satisfy the relation: $TTL/ImgH<5.0$.

16. A compact imaging lens assembly comprising, in order from an object side to an image side:

a first lens element with negative refractive power having a convex object-side surface and a concave image-side surface, at least one of the object-side and image-side surfaces thereof being aspheric;

a second lens element with positive refractive power having a convex image-side surface, at least one of the object-side and image-side surfaces thereof being aspheric; and an aperture stop disposed between the second lens element and an image plane; wherein there are two lens elements with refractive power in the compact imaging lens assembly; wherein the compact imaging lens assembly further comprises an electronic sensor disposed at the image plane for image formation thereon; and wherein half of the diagonal length of the effective pixel area of the electronic sensor is ImgH, a focal length of the compact imaging lens assembly is f, and they satisfy the relation: $\text{Tan}^{-1}(\text{ImgH}/f)>42$ deg.

17. The compact imaging lens assembly according to claim 16, wherein the object-side surfaces and image-side surfaces of the first and second lens elements are aspheric.

18. The compact imaging lens assembly according to claim 17, wherein the focal length of the compact imaging lens assembly is f, a focal length of the second lens element is f2, and they satisfy the relation: $0.40<f/f2<1.20$.

19. The compact imaging lens assembly according to claim 18, wherein the focal length of the compact imaging lens assembly is f, the focal length of the second lens element is f2, and they satisfy the relation: $0.60<f/f2<0.95$.

20. The compact imaging lens assembly according to claim 17, wherein a distance near the optical axis between the first and second lens elements is T12, the focal length of the compact imaging lens assembly is f, and they satisfy the relation: $0.60<T12/f<2.00$.

21. The compact imaging lens assembly according to claim 16, wherein a radius of curvature of the image-side surface of the first lens element is R2, and it satisfies the relation: $2.0\text{ mm}^{-1}<1/R2<5.0\text{ mm}^{-1}$.

22. The compact imaging lens assembly according to claim 17, wherein a radius of curvature of the object-side surface of the first lens element is R1, a radius of curvature of the image-side surface of the first lens element is R2, and they satisfy the relation: $R1/R2>2.5$.

23. A compact imaging lens assembly comprising, in order from an object side to an image side:

a first lens element with negative refractive power having a convex object-side surface and a concave image-side surface, at least one of the object-side and image-side surfaces thereof being aspheric;

a second lens element with positive refractive power having a convex image-side surface, at least one of the object-side and image-side surfaces thereof being aspheric; and an aperture stop disposed between the second lens element and an image plane; wherein there are two lens elements with refractive power in the compact imaging lens assembly; and wherein a radius of curvature of the object-side surface of the second lens element is R3, a radius of curvature of the image-side surface of the second lens element is R4, a radius of curvature of the object-side surface of the first lens element is R1, a radius of curvature of the image-side surface of the first lens element is R2, and they satisfy the relations: |R3/R4|>1.5, R1/R2>2.5.

24. The compact imaging lens assembly according to claim 23, wherein a focal length of the compact imaging lens assembly is f, a focal length of the first lens element is f1, the radius of curvature of the object-side surface of the second lens element is R3, the radius of curvature of the image-side surface of the second lens element is R4, and they satisfy the relations: $-0.90<f/f1<-0.40$, $|R3/R4|>3.0$.

25. The compact imaging lens assembly according to claim 23, wherein the radius of curvature of the image-side surface of the first lens element is R2, and it satisfies the relation: $2.0 \text{ mm}^{-1}<1/R2<5.0 \text{ mm}^{-1}$.

* * * * *